United States Patent [19]

Takahashi et al.

[11] Patent Number: 5,559,180

[45] Date of Patent: Sep. 24, 1996

[54] POLYACETAL COMPOSITIONS FOR USE IN WEAR APPLICATIONS

[75] Inventors: Tatsuhiro Takahashi, Kanagawa, Japan; Edmund A. Flexman, Wilmington; Robert J. Kassal, Newport, both of Del.

[73] Assignee: E. I. Du Pont de Nemours and Company, Wilmington, Del.

[21] Appl. No.: 415,869

[22] Filed: Apr. 3, 1995

Related U.S. Application Data

[63] Continuation-in-part of Ser. No. 243,611, May 16, 1994, abandoned, which is a continuation of Ser. No. 35,062, Mar. 22, 1993, abandoned.

[51] Int. Cl.$^6$ .............................. B29D 22/00; C08L 71/00
[52] U.S. Cl. ...................... 524/512; 524/233; 524/268; 524/377; 524/487; 524/315; 524/318; 524/593; 525/154; 525/400; 525/401
[58] Field of Search ................................. 525/154, 400, 525/401; 524/233, 268, 377, 487, 512, 315, 318, 593

[56] References Cited

U.S. PATENT DOCUMENTS

| | | | |
|---|---|---|---|
| 4,436,200 | 3/1984 | Hodlewsky et al. | 198/851 |
| 4,649,172 | 3/1987 | Yanase et al. | 524/512 |
| 4,666,995 | 5/1987 | Auerbach et al. | 525/400 |
| 5,173,532 | 12/1992 | Endo et al. | 524/512 |

*Primary Examiner*—Paul R. Michl
*Assistant Examiner*—Andrew E. C. Merriam

[57] ABSTRACT

A polyacetal composition is provided for use in plastic-plastic wear applications, said composition containing about 85 to 99 weight percent polyacetal, about 0 to 5 weight percent polytetrafluoroethylene fibers, about 0.5 to 5 weight percent ethylene methyl acrylate copolymer, and about 0.5 to 5 weight percent of at least one lubricant. The compositions are particularly useful in forming shaped articles for use especially in conveyor chain applications and gear applications.

6 Claims, 1 Drawing Sheet

POLYACETAL COMPOSITIONS FOR USE IN WEAR APPLICATIONS

This is a continuation-in-part of application Ser. No. 08/243,611, filed May 16, 1994, now abandoned, which was a continuation of application Ser. No. 08/035,062 filed Mar. 22, 1993, now abandoned.

BACKGROUND OF THE INVENTION

The present invention relates to polyacetal compositions that are especially useful in plastic-plastic wear systems. A wear system is one in which the surface of one part of the system bears against the surface of another part of the system, thereby causing friction and wear of each part. In a plastic-plastic system, the parts of the system bearing against each other are each plastic. In addition, it was found that the compositions of the present invention have good warpage properties.

More specifically, the present invention is directed towards the use of polyacetal compositions containing ethylene methyl acrylate and a lubricant, and optionally polytetrafluoroethylene fibers, in said wear systems. The compositions are especially useful in wear systems due not only to their excellent wear resistance, but also due to their ability to maintain substantially constant wear resistance under varying maximum pressure molding conditions. Further, it has been found that the compositions of the present invention that contain pigments, said pigments often being added in the final applications, also maintain substantially constant wear in the face of varying molding conditions, especially maximum pressure molding conditions.

It is known that polyacetal compositions are used in plastic-plastic wear systems, such as, in particular, conveyor chain systems. Conveyor chains are well known in the art. Generally, they are made from a series of links having flat tops, said links being connected to each other by pins. The pins are in most cases made from stainless steel or plastic resins. The conveyor chain links can be made from thermoplastic resin, such as polyacetal resin. The conveyor chain links move on a guided rail and they are driven by gear sprockets located on both ends of the conveyor chain line. The gears can also be made of polyacetal resin.

There are many types of conveyor chains. However, two types of conveyor chains, the flat-top conveyor chain and the open hinge conveyor chain, are predominant.

Flat top conveyor chains move straightly and flexibly. They are generally made of single width chain links having relatively limited contact with the driving gear sprockets. However, these chain links have noticeable contact with guided rails, said rails usually being made of stainless steel or wear resistant plastic resin. Flat top conveyor chain links are connected to each other by pins, said pins also usually being made of stainless steel or wear resistant plastics. Thus, in a flat top conveyor chain system, wear occurs between the pin and the chain link, on the flat top surface due to carried materials, on the part of the link in contact with the driving sprockets, on the part of the link in contact with the guide rails, and on the part of a link that is in contact with another link. In order to improve, or lessen, the degree of wear experienced by links in such a conveyor chain system, the mold design of the conveyor chain link is becoming more and more complex. Further, many end-users prefer to add pigments to the compositions used for making the chain components. As such, there also exists a need to develop pigmented compositions that are not unduly influenced by variations in molding conditions.

Open hinge conveyor chains have a wide carrying table and a large contact area between the chain links and the drive sprockets. Open hinge conveyor chain links have open areas constituting from 10% to 50% of the link, depending on the design. Open hinge conveyor chains are mostly used for straightly transporting foods. As such, it is desirable for the links to have these open areas because food is often cleaned directly on the links and also it permits easy cleaning of the chain links themselves. However, these open areas on a chain link create very complicated molding designs.

As the mold designs for conveyor chain links become more and more complicated and color becomes important, it becomes more and more challenging to find suitable thermoplastic resin compositions that will flow sufficiently and economically through the complicated mold design, that will have good resistance to constant wear, and that will not be unduly influenced by varying molding conditions or the inclusion therein of pigments. For example, it has been found that small changes in mold processing parameters (such as molding temperature, injection speed, injection pressure, or molding cycle) and/or small changes in mold gate design (such as the number of gates or the position of the gates) can have great influence on the surface appearance, and in turn, the wear resistance, of molded conveyor chain links. Changes in molding conditions are common in commercial applications. The surface appearance (such as gloss, roughness, and weld line appearance) of a chain link can have an effect on the wear resistance of the chain link. For example, the amount and position of weld lines of the surface of the molded part, or the percentage of solid additives in the resin that are located near the surface of the molded part, can adversely impact the wear resistance of the molded part. As such, there exists a continuing need to develop resins for use in wear applications that have good and substantially constant surface appearances and wear resistances, even though the conditions under which molding occurs are varied and/or pigments are added therein. In addition, there exists a need to develop resins for use in wear applications wherein said resins have improved resistance to warpage.

U.S. Pat. No. 4,436,200 discloses a conveyor chain system wherein the conveyor chain links are molded from a composition of polyacetal and polytetrafluoroethylene fibers. The chain links are reported to have good wear resistance. However, it has been found that although such compositions result in conveyor chain links having good wear resistance, the surface appearance of chain links molded from the composition is strongly influenced by variations in molding conditions (such as temperature, pressure, speed, and/or cycle time) and pigments. This finding is partly due to the fact that while polyacetal compositions containing polytetrafluoroethylene fibers have better wear resistance than polyacetal compositions containing polytetrafluoroethylene micropowder, the fibers are large (e.g., on average, more than 10 micron diameter and 30 micron length), especially when compared to micropowder. The combination of both these factors, it is believed, results in resin that is sensitive to changes in molding conditions and the addition thereto of pigments. Hence, it has been found that the wear resistance of links molded from such a composition varies from one molding condition to another and it varies from the exclusion or inclusion of pigments. As such, there still exists a need for a resin useful for wear applications that has good wear resistance and in addition, maintains that wear resistance over varying molding conditions.

It was unexpectedly found that the incorporation of ethylene methyl acrylate copolymer, along with at least one lubricant that is fluidized below the temperature at which polyacetal is melt processed, into polyacetal results in compositions having good wear resistance. It has further been found that the wear resistance of parts molded from the composition remains substantially constant over varying maximum pressure molding conditions and that it is not unduly influenced by the inclusion therein of pigments. It has further been found that the warpage experienced by parts molded from such resins is less than would be predicted from the individual components. Shaped articles made from these compositions are useful in plastic-plastic wear applications, such as, in particular, conveyor chain link applications, where good and constant wear resistance is required even under varying molding conditions and even with the addition of pigments.

SUMMARY OF THE INVENTION

The present invention provides a composition for use in plastic-plastic wear applications comprising (1) about 85 1to 99 weight percent of a polyacetal resin, (b) about 0 to 5 weight percent of polytetrafluoroethylene fibers, (c) about 0.5 to 5 weight percent ethylene methyl acrylate copolymer, and (d) about 0.5 to 5 weight percent of at least one lubricant, said weight percent based upon the total weight of components (a), (b), (c), and (d) only. The compositions have good wear resistance, said wear resistance not being substantially diminished under varying molding pressure conditions and/or the inclusion therein of pigments.

DETAILED DESCRIPTION OF THE INVENTION

Figure 1:
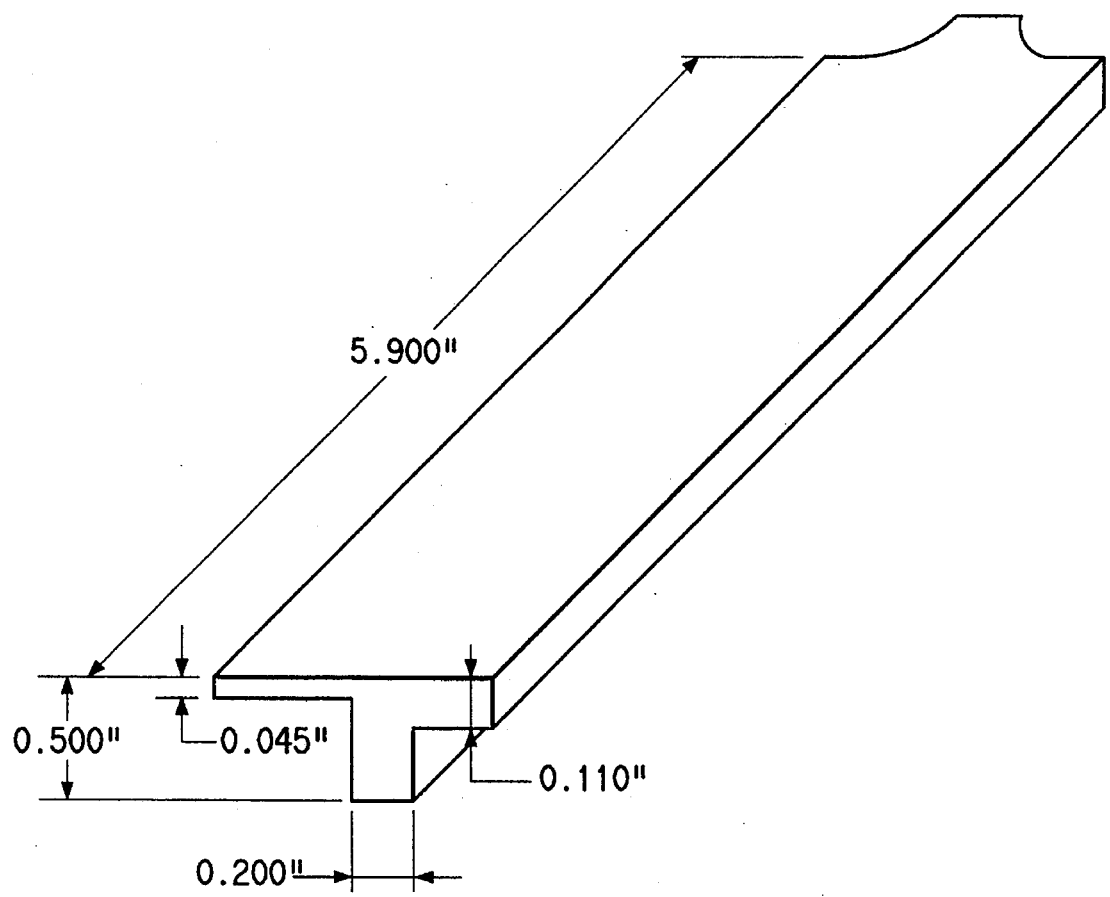
"FIG. 1 shows a longitudinal rib mold (LRM) of the compounded compositions of the present invention."

It has been found in the present invention that polyacetal compositions containing ethylene methyl acrylate copolymer and at least one lubricant have excellent wear resistance, said wear resistance not being substantially diminished by variations in maximum pressure molding conditions and/or the inclusion therein of pigments.

More specifically, the compositions of the present invention that are particularly useful in wear applications comprise (a) about 85 to 99 weight percent polyacetal, (b) about 0 to 5 weight percent polytetrafluoroethylene fibers, (c) about 0.5 to 5 weight percent ethylene methyl acrylate copolymer, and (d) about 0.5 to 5 weight percent of at least one lubricant. Preferably, the compositions comprise (a) about 88 to 97 weight percent polyacetal, (b) about 1 to 4 weight percent polytetrafluoroethylene fibers, (c) about 1 to 4 weight percent ethylene methyl acrylate copolymer, and (d) about 1 to 4 weight percent of at least one lubricant. Most preferably, the compositions comprise (a) about 91 to 97 weight percent polyacetal, (b) about 1 to 3 weight percent polytetrafluoroethylene fibers, (c) about 1 to 3 weight percent ethylene methyl acrylate copolymer, and (d) about 1 to 3 weight percent of at least one lubricant. The weight percents given above are based upon the total weight of components (a), (b), (c), and (d) only.

The polyacetal component used herein includes homopolymers of formaldehyde or of cyclic oligomers of formaldehyde, the terminal groups of which are end-capped by esterification or etherification, copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification, or a mixture of such homopolymers and copolymers. End-capping is generally done to prevent the polyacetal from "unzipping" as it tends to do at elevated temperatures. Acetal copolymers contain at least one comonomer. Comonomers commonly used in preparing acetal copolymers include alkylene oxides of 2–12 carbon atoms and their cyclic addition products with formaldehyde. The quantity of comonomer is generally not more than about 20 weight percent, preferably not more than about 15 weight percent, and most preferably about 2 weight percent. The most preferred comonomer is ethylene oxide. The preferred acetal homopolymers include those whose terminal hydroxyl groups have been end-capped by a chemical reaction to form ester or ether groups, preferably acetate or methoxy groups, respectively.

The polyacetal used in the compositions described herein may be branched or linear. It generally has a number of average molecular weight in the range of about 10,000 to 100,000, preferably about 20,000 to 75,000. These polyacetal molecular weights are generally preferred in order to provide an optimum balance of good mixing of the various ingredients to be melt blended into the composition with the most desired combination of physical properties in the molded articles made from the such compositions; however, polyacetals having higher or lower molecular weight averages may be used, depending on the physical and processing properties desired. The molecular weight of the polyacetal may conveniently be measured by gel permeation chromatography in m-cresol at 160° C. using a DuPont PSM bimodal column kit with nominal pore size of 60 and 1,000 angstroms.

The optional polytetrafluoroethylene fiber component is commercially available from E. I. du Pont de Nemours and Company. Polytetrafluoroethylene fibers are generally produced by either the spinning of polytetrafluoroethylene powder raw material or by cutting from a polytetrafluoroethylene sheet, rod, or slab. These fibers are dispersed in the polyacetal resin composition as solid filler. The fibers are generally, though not limited to, 10 microns to 100 microns in diameter and about 1/128 to 1/8 inches in length. Preferably, the fibers are generally about 10 microns to 20 microns in diameter and about 1/128 to 1/32 inches in length. It is understood that the term polytetrafluoroethylene fiber includes polytetrafluoroethylene mono-filament.

The ethylene methyl acrylate copolymer ("EMA") component is commercially available and can be prepared from known references. The amount of methyl acrylate in the EMA is generally 3–30 weight percent, preferably 15–25 weight percent, of the EMA. It is preferred that the EMA be dispersed in the polyacetal as small particles. It has been found that such small particles are beneficial because they can appear on the surface of a molded part but, due to their small size, they are not unduly influenced by varying molding conditions, thereby resulting in molded polyacetal parts having consistent wear resistance, even under varying molding conditions. Preferably, the number average particle size of the EMA in the polyacetal is less than 15 microns, more preferably less than 10 microns, and most preferably less than 5 microns. The number average particle size of the EMA in the polyacetal can be determined by standard techniques of transmission electron microscopy.

The lubricant component is a lubricant that is capable of being dispersed in the polyacetal resin. The lubricant may be a liquid at normal room temperatures. Alternatively, if the lubricant is a solid at normal room temperatures, it must become fluidized at a temperature lower than the temperature at which the polyacetal is melt processed. Examples of useful lubricants include paraffin wax, paraffin oil, fatty esters, fatty amides, silicon oil, silicon gym, and polyether glycol. Most preferred lubricants include paraffin wax, fatty acids, and fatty amides. As with the EMA component, it is preferred that the lubricant be dispersed in the polyacetal as small particles. Preferably, the number average particle size of the lubricant in the polyacetal is less than 15 microns, more preferably less than 10 microns, and most preferably less than 5 microns. Number average particle size can be determined as discussed above.

It should be noted that the particle sizes mentioned above are recommended, but not required. An acceptable average particle size range will be obtained if the components are mixed together in a twin-screw extruder, which is the preferred mixing device.

The compositions useful in the present invention may also include, in addition to the components described above, other ingredients, modifiers, and additives as are generally used in polyacetal compositions, including thermal stabilizers and co-stabilizers, antioxidants, colorants (including pigments), toughening agents (such as thermoplastic polyurethanes), reinforcing agents, ultraviolet stabilizers (such as benzotriazoles or benzophenones), including hindered amine light stabilizers (especially those wherein the hindered nitrogen is of tertiary amine functionality or wherein the hindered amine light stabilizer contains both a piperidine, or piperazinone ring, and a triazine ring), nucleating agents (such as boron nitride or talc), glass, and fillers. Suitable thermal stabilizers include nylon terpolymers; poly-beta-alaine (as described in West German published application. 3715117); stabilizers disclosed in U.S. Pat. Nos. 4,814,397, 4,766,168, 4,640,949, and 4,098,984; and mixtures of any of the above. Preferred antioxidants include triethyleneglycolbis(3-(3'-tertbutyl- 4'hydroxy-5'methylphenyl)proprionate, N,N'-hexamethylenebis(3,5-di-tert-butyl-4-hydroxy-hydrocinnamide), and mixtures thereof. It should also be understood that some pigments and colorants may adversely affect the thermal or oxidative stability of polyacetal compositions, but should not significantly affect physical properties (provided there is sufficient dispersion of the pigments or colorants in the polyacetal).

The compositions described herein may be prepared by mixing all components with the acetal polymer at a temperature above the melting point of the acetal polymer by methods know in the art. It is known to use intensive mixing devices, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating, in preparing thermoplastic polyacetal compositions. These devices may be used alone or in combination with static mixers, mixing torpedoes and/or various devices to increase internal pressure and/or the intensity of mixing, such as valves, gates, or screw designed for this purpose. Extruders are preferred, with twin screw extruders being most preferred. Of course, such mixing should be conducted at a temperature below which significant degradation of the polyacetal component will occur. Generally, polyacetal compositions are melt processed at between 170° C. and 280° C., preferably between 185° C. and 240° C., and most preferably 195° C. and 225° C.

Shaped articles, especially those for use in wear applications (such as articles shaped to form links of conveyor chains, as described in U.S. Pat. No. 4,436,200, or gear links), may be made from the compositions of the present invention using methods known in the art, including compression molding, injection molding, extrusion, blow molding, rotational molding, melt spinning, and thermoforming. Injection molding is preferred. When injection molding the compositions of the present invention, it is preferred that the mold be as cold as possible, consistent with the intricacy of the shaped article being produced. Generally, the mold temperature will be 10°–120° C., preferably 20°–° C., and most preferably about 50°–90° C.

EXAMPLES

Specific embodiments of the present invention are included in, but not limited to, the examples below.

EXAMPLES 1–7

The components used in examples 1–7 are described below.

"POM" was a commercially available acetal homopolymer having a number average molecular weight of about 40,000 containing 0.10 weight percent of an antioxidant and 0.75 weight percent of a thermal stabilizer. POM had a density of 1.41 g/mi.

"PTFE fiber" was polytetrafluoroethylene fiber, said fibers having on average a diameter of 15 microns and a length of 1/64 inches.

"EMA" was a commercially available ethylene methyl acrylate copolymer having a methyl acrylate content of 20 weight percent and a melt flow rate of 2, as measured by ASTM D 1238.

"PEG" was polyethylene glycol having a number average molecular weight of 8000.

"Paraffin" was a commercially available paraffin wax having a melting point of about 100° C.

"Gray" was a 3:1 mixture of titanium dioxide white pigment:carbon black.

The constituency of the compositions of examples 1–7 is described in Table 1 below. Unless otherwise specified, the compositions were prepared by mixing the components in a hopper and compounding the resultant mixture in a 28 mm twin screw extruder using barrel temperature settings in the range of 180° to 220° C. The temperature of the melt as it exited the die ranged from 180° to 220 ° C.

The compositions of examples 1–7 were molded into tensile bars on a molding machine having a double gated tensile bar mold, said gate having dimension of 1 mm×1 mm. This mold is similar to molds used to prepare conveyor chains because it results in molded products having multiple weld lines. The dimensions of the molded tensile bars were as given in ASTM D638. The bars were molded using a molding temperature setting of 190° C. and an injection speed of 2 seconds. The maximum pressure capacity used to mold the samples was varied, as set forth in the Table 1 below.

The wear resistance of each sample composition was measured using a reciprocal wear tester. The molded tensile bar, prepared as described above, was clamped on a reciprocating movement table that moved 2.75 inches in horizontal distance. A machined POM part, having dimensions of ¼ inch width and 1 inch length, prepared as described above, was attached to a stationary holding arm. The holding arm was positioned such that the machined POM part was in contact with, and on top of, the tensile bar. A weight was added to the holding arm in order to apply pressure between the upper machined part and the lower tensile bar. The average speed of the reciprocating movement table was set at 30 fpm (feet per rain). The pressure on the tensile bar was 40 psi. The sample was tested for a time period of 3 hours. The weight of the POM machined part was measured before and after testing to determine weight loss. The same was done for the tensile bar. Wear factor was determined by the formula:

$$W = K \times F \times V \times T$$

wherein W=wear volume (inches$^3$), calculated from the formula $$\frac{\left(\begin{array}{c}\text{Weight loss}\\ \text{POM machined}\\ \text{part}\end{array}\right) + \left(\begin{array}{c}\text{Weight loss}\\ \text{tensile}\\ \text{bar}\end{array}\right)}{\text{density of POM (g/ml)}};$$

K=wear factor(inches$^3$—min/ft-lb-hr);
F=force (lbs);
V=velocity (ft/min); and
T=time (hr).

Wear factor results are given in the Table 1, below.

TABLE 1

| Ex. No. | Composition | Wear Factor 10% max pressure capacity | 30% max pressure capacity | 40% max pressure capacity |
|---|---|---|---|---|
| 1 | 100% POM | 100,000 | 100,000 | 100,000 |
| 2 | 97% POM 3% PTFE fiber | 30,000 | 37,000 | 44,000 |
| 3 | 95.5% POM 2.5% EMA 2.0% Paraffin | 4,000 | 4,000 | 4,000 |
| 4 | 93.5% POM 2.0% PTFE fiber 2.5% EMA 2.0% Paraffin | 4,000 | 4,000 | 4,000 |
| 5 | 96% POM 3% PTFE fiber 1% PEG | 30,000 | 37,000 | 44,000 |
| 6 | 95.6% POM 3.0% PTFE fiber 1.0% PEG 0.4% Gray | 48,000 | 66,000 | 72,000 |
| 7 | 93.1% POM 2.0% PTFE fiber 2.5% EMA 2.0% Paraffin 0.4% Gray | 4,000 | 4,000 | 4,000 |

Example 1 given above showed that POM had poor wear resistance, but that the wear resistance was constant under changes in maximum pressure molding conditions. Example 2 showed that the wear resistance of POM was improved by the inclusion therein of PTFE fiber, but that the wear resistance was affected by changes in maximum pressure molding conditions. Examples 3 and 4 showed that the inclusion of EMA and Paraffin into POM not only substantially improved the wear resistance of POM, but also resulted in a product having a wear resistance that remained constant under changes in maximum pressure molding conditions.

Example 6 shows that the inclusion of gray pigment into a composition (such as that of example 5) resulted in decreased wear resistance and variation in wear resistance over varying molding conditions. The composition of example 7, which was similar to the pigmented composition of example 6, but which also contained EMA and Paraffin, had excellent wear resistance that was not substantially diminished with varying maximum pressure molding conditions (even though pigment was contained in the composition).

EXAMPLES 8–14

The components used in examples 8–12 were as follows:

"POM" was a polyacetal homopolymer composition sold commercially by the DuPont Company as Delrin®500. It had a number average molecular weight of about 40,000 and contained about 0.1 weight percent of an antioxidant, 0.65–0.80 weight percent of a thermal stabilizer system, and 1.25 weight percent polyethylene glycol (8000 molecular weight).

"EMA" was a commercially available copolymer of ethylene and methyl acrylate containing about 20% methyl acrylate. It had a flow number of 2 and a melting point of 83° C.

"PE wax" was a high-melting, low molecular weight polyethylene wax (nominally, a 22-mer) sold by Henkel Corporation under the name Loxiol G-22. It had a reported solidification point of 92°–96° C.

The constituency of the compositions of examples 8–12 is described in Table 2 below. Unless otherwise specified, the components (including antioxidants and thermal stabilizers) were compounded in a 28mm twin screw extruder, with barrel temperature settings of about 190° C. and a flow rate of about 25 pounds per hour.

The compounded compositions were molded to make a longitudinal rib mold (LRM) using a Model 150-RS-3 6-ounce VanDorn reciprocating screw molding machine. The LRM is shown in FIG. 1. Barrel and nozzle temperatures were set to 190° C. (rear), 200° C. (center, front), and 210° C. (nozzle) and the mold temperature was set to 90° C. A 20-second screw forward time and 15-second hold time were used with a screw speed setting of 60 rpm and a 50 psi back pressure injection speed was set to 1.8 seconds and injection pressure was set to 4600 psi. Ten molds were measured for each composition and each state (i.e., annealed, unannealed). Annealing was done in a circulating air oven at 150° C. for 15 minutes, then at 130° C. for 15 minutes, then at 110° C. for 15 minutes, and then allowed to fall to room temperature). Warpage was measured by chord depth in the center of the specimen for the LRM. "Chord depth in the center" is measured by drawing a line from one end of the specimen to the other end across the top of the side that is U-shaped (since the specimen is warped in the middle) and then measuring the distance from that line to the center of the specimen. Results are provided in Table 2, below.

The results given in Table 2 show that the warpage experienced by examples 11 and 12 (which each contained both EMA and PE wax) was less (i.e., better) than that experienced by example 9 (which contained PE wax but not EMA) and example 10 (which contained EMA but not PE wax).

TABLE 2

| Example No. | Weight percent POM | Weight percent EMA | Weight percent PE Wax | Warpage (LRM) Annealed | Warpage (LRM) Unannealed |
|---|---|---|---|---|---|
| 8 | 100 | — | — | 77 | 48 |
| 9 | 98 | — | 2 | 77 | 49 |
| 10 | 97.6 | 2.4 | — | 80 | 53 |
| 11 | 95.5* | 2.5 | 2 | 71 | 41 |
| 12 | 95.2* | 4.0 | 0.8 | 69 | 41 |

*POM did not contain polyethylene glycol.

What is claimed is:

1. A composition comprised of
   (a) about 85 to 99 weight percent polyacetal,
   (b) 0 to 5 weight percent polytetrafluoroethylene fibers,
   (c) about 0.5 to 5 weight percent of an ethylene methyl acrylate copolymer having a number average particle size of less than 15 microns, and
   (d) about 0.5 to 5 weight percent of at least one lubricant, with said percents being based upon the total weight of components (a), (b), (c), and (d) only.

2. The composition of claim 1 wherein the polyacetal is an acetal homopolymer.

3. The composition of claim 1 wherein the polyacetal is an acetal copolymer.

4. The composition of claim 1 wherein the lubricant is selected from the group consisting of paraffin wax, paraffin oil, fatty esters, fatty amides, silicon gum, silicon oil, and polyether glycol.

5. The composition of claim 1 further comprising at least one of thermal stabilizers, co-stabilizers, antioxidants, colorants, toughening agents, reinforcing agents, ultraviolet light stabilizers, nucleating agents, glass, fillers, or mixtures thereof.

6. The composition of claim 1, wherein the composition comprises from 1 to 4 weight percent polytetrafluoroethylene fibers.

* * * * *